US007009936B1

(12) United States Patent
Kangas et al.

(10) Patent No.: US 7,009,936 B1
(45) Date of Patent: Mar. 7, 2006

(54) DATA TRANSMISSION RESOURCES OPTIMIZATION

(75) Inventors: Arto Kangas, Espoo (FI); Anssi Juppi, Helsinki (FI); Juha Räsänen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/807,471

(22) PCT Filed: Oct. 11, 1999

(86) PCT No.: PCT/FI99/00840

§ 371 (c)(1),
(2), (4) Date: Jun. 21, 2001

(87) PCT Pub. No.: WO00/22854

PCT Pub. Date: Apr. 20, 2000

(30) Foreign Application Priority Data

Oct. 13, 1998 (FI) ..................................... 982222

(51) Int. Cl.
*G06F 11/00* (2006.01)

(52) U.S. Cl. ...................... 370/229; 370/231; 370/232; 370/329; 370/332

(58) Field of Classification Search ................ 370/329, 370/326, 338, 331, 332, 231, 235, 401, 428; 455/439
See application file for complete search history.

(56) References Cited

U.S. PATENT DOCUMENTS 5,258,979 A * 11/1993 Oomuro et al. ............. 370/232
5,684,791 A 11/1997 Raychaudhuri et al.
5,978,380 A * 11/1999 Kobayashi et al. ......... 370/410
6,347,091 B1 * 2/2002 Wallentin et al. ........... 370/437
6,490,271 B1 * 12/2002 Erjanne ...................... 370/347

FOREIGN PATENT DOCUMENTS

WO WO 96/10320 4/1996
WO WO 97/23110 6/1997

* cited by examiner

*Primary Examiner*—Chi Pham
*Assistant Examiner*—Christopher Grey
(74) *Attorney, Agent, or Firm*—Pillsbury Winthrop Shaw Pittman LLP

(57) ABSTRACT

A method and an apparatus implementing the method for optimizing data transmission resources, particularly resources on the air interface, between terminals and a network element. To diminish capacity differences of different legs or connection parts in the connection, the network adapts (2-5, 2-10A, 2-13) the traffic channel resources between the terminal and the network to be suitable for the outward connection of the network element, e.g. the connection to another mobile station or to a fixed network, by observing and comparing the data transmission capacities of the connection parts or by receiving from the outward connection part the information (2-4, 2-9A, 2-9B, 2-12, 2-14) on its data transmission capacity.

24 Claims, 4 Drawing Sheets

DATA TRANSMISSION RESOURCES OPTIMIZATION

BACKGROUND OF THE INVENTION

The invention relates to the optimization of the use of data transmission resources in a data call, and particularly to the optimization of the use of traffic channels on the air interface of high speed data transmission services based on multichannel technology.

Modern mobile communication systems provide subscribers with both normal speech transmission and various data transmission functions. In mobile communication systems, the data transmission capacity available on the air interface is divided between several users by using a multiple access principle. The most common multiple access principles include time division multiple access (TDMA), code division multiple access (CDMA) and frequency division multiple access (FDMA). In TDMA systems, communication over a radio path takes place on a time division basis in successive recurrent TDMA frames, each of which comprises several time slots. Time slots are mainly used for transferring control channels and traffic channels. Traffic channels are used for transmitting speech and data. In this application, data refers to any information conveyed in a digital telecommunication system. Such information may comprise digitized speech, inter-computer data communication, telefax data, short program-code segments etc. Control channels are used for signalling between a base transceiver station and mobile stations. An example of a TDMA radio system is the pan-European mobile system GSM (Global System for Mobile Communications).

In modern mobile communication systems, depending on the data transmission rate required, a traffic channel may comprise one subchannel (e.g. a TDMA time slot) or several subchannels (e.g. many TDMA time slots for a high speed data transmission). In the GSM system, for example, a high speed data service HSCSD (High Speed Circuit Switch Data) is defined, in which a traffic channel may comprise several subchannels. Channels and subchannels can be allocated symmetrically or asymmetrically. Correspondingly, a high speed data service has been planned, for example, for so-called third-generation mobile communication systems, such as the UMTS (Universal Mobile Telecommunication System) and the IMT-2000 (International Mobile Telecommunication 2000). Also in professional mobile radio systems, e.g. the TETRA (Terrestrial Trunked Radio), it is possible to allocate several subchannels to one connection. The user's data transmission rate on the air interface is affected by the number of subchannels and also the used channel coding method.

FIG. 1 shows one possible data transmission situation in the GSM mobile communication system. In the example of FIG. 1, a data transmission call is a call between two mobile stations. When a mobile station MS A makes a data transmission call to a mobile station MS B, a leg 1 is formed for the call, i.e. the connection, between the mobile station MS A and a serving mobile services switching centre MSC 1. Correspondingly, a leg 2 is formed for the same connection between the mobile station MS B and a serving mobile services switching centre MSC 2. A number of subchannels that is required by the data transmission rate are allocated to both legs 1 and 2. One leg is not aware of the situation of the other leg, although both legs were served by the same mobile services switching centre. As, for example, the data transmission rate of the call leg 1 on the air interface Air varies due to the upgrade, i.e. the increase in the number of subchannels, for instance, or due to the downgrade, i.e. the decrease in the number of subchannels, the leg 2 does not follow. As a result of upgrading the leg 1, the mobile station MS A may thus uselessly allocate subchannels from the air interface, which subchannels it cannot use because of the poorer data transmission rate of the leg 2. Correspondingly, as a result of downgrading the leg 1, the mobile station MS B may uselessly allocate subchannels from the air interface, which subchannels it cannot use due to the decreased data transmission rate of the leg 1. The situation remains the same, whether the mobile stations MS A and MS B are served by the same or a different mobile services switching centre.

A problem in the arrangement described above is that the air interface cannot be utilized in the most efficient way, because the information on the data transmission rate change of one leg is not conveyed to the other leg of the same connection. The efficient utilization of the radio spectrum is the main factor in planning and implementing mobile communication networks.

The inefficient use of traffic channels may present a problem also in a call between a mobile station and a fixed network. A fixed network part can provide (e.g. due to an autobauding handshaking of modems or the used fixed network protocol) a data rate much higher or much lower than requested at the call set-up stage. A problem may also be provisory, caused by the quality of the connection or network.

The inefficient use of traffic channels may present a problem in fixed network calls, too. For example, when data is transferred in a broadband network between two narrowband ISDN networks, several time slots can be allocated to the connection on both ISDN network sides, in which case the data transmission rate on different ISDN network sides is not necessarily the same and the resources of one side can be wasted.

BRIEF DESCRIPTION OF THE INVENTION

It is thus an object of the invention to provide a method and an apparatus implementing the method to eliminate the above problems. The object of the invention is particularly to utilize the available channel capacity as efficiently as possible. The objects of the invention are achieved by a method, a system and an interworking unit, which are characterized by what is said in the independent claims 1 and 11, 15 and 19. The preferred embodiments of the invention are disclosed in the dependent claims. An interworking unit refers herein to any network element with an interworking function in a data transmission network.

The invention is based on the network suitably adapting the traffic channel resources between a mobile station and the network to the outward connection of the network element, e.g. the connection to another mobile station or the connection to the fixed network, by observing and comparing the data transmission capacity of connection parts or by receiving information from the outward connection on its data transmission capacity.

The method, system and interworking unit of the invention provide the advantage of using traffic channels, e.g. radio channels, efficiently in multichannel calls. A suitable number of channels are always allocated in respect of the capacity of the entire end-to-end connection. The method provides a user with the highest possible data rate with the lowest possible costs. For the network operator, the method allows the optimisation of network resources measuring and use and a service with a better price-quality ratio for users.

In a preferred embodiment of the invention, the capacity allocated from the data transmission resources is controlled by the amount of padding transmitted over the connection and by flow control. This provides the advantage that information on the capacity of one end need not be transmitted separately, because it can be concluded on the basis of the amount of padding and the flow control. Further, the real need for capacity will be found out and the capacity can be adapted to it.

In another preferred embodiment of the invention, the capacity allocated from the data transmission resources is controlled by the amount of padding transmitted over the connection and the need for buffering. Also this provides the advantage that information on the capacity of one end need not be transmitted separately, because it can be concluded on the basis of the amount of padding and the need for buffering. Further, the real need for capacity will be found out and the capacity can be adapted to it.

In a preferred embodiment of the invention, in which the connection is a connection between mobile stations, the air interface capacities are arranged to correspond to each other by conveying information on the capacity allocated from the air interface to the other mobile station. This provides the advantage that a capacity for the same data transmission rate is allocated from the air interface to both mobile stations participating in the same call.

BRIEF DESCRIPTION OF THE FIGURES

The invention will now be described in greater detail in connection with the preferred embodiments, with reference to the attached drawings, in which.

DETAILED DESCRIPTION OF THE INVENTION

The present invention can be applied both to telecommunication systems based on a fixed network and to all digital wireless telecommunication systems, such as cellular systems, WLL-type (Wireless Local Loop) and RLL-type (Radio Local Loop) networks, satellite-based mobile communication systems etc. The invention is particularly applicable to the optimisation of the use of the resources on the air interface in a mobile communication system, as the resources on the air interface are limited. In this connection, the term 'mobile communication system' (or network) refers to all wireless telecommunication systems generally. There are several multiple access modulation technologies to facilitate the communication with a plurality of mobile users. These technologies include time division multiple access (TDMA), code division multiple access (CDMA) and frequency division multiple access (FDMA). The physical concept of a traffic channel varies in different multiple access methods, and it is primarily defined by means of a time slot in TDMA systems, a spreading code in CDMA systems, a radio channel in FDMA systems, a combination of these etc. In modern mobile communication systems, it is possible to allocate a set of two or more basic-rate traffic channels (subchannels), or a so-called high speed traffic channel, to a mobile station for high speed data transmission. In this connection, the term 'traffic channel' refers both to a single basic-rate traffic channel and to a high speed traffic channel consisting of two or more basic-rate traffic channels (subchannels). The basic idea of the present invention is not dependent on the traffic channel type and the multiple access method used.

In the following, the invention will be described by using the GSM mobile communication system as an example, without restricting the invention to this system in any way. The structure and operation of the GSM system are known to a person skilled in the art. The basic structure of the GSM system comprises a base station subsystem BSS and a network subsystem NSS. The BSS and mobile stations MS communicate over radio connections via the air interface Air. In the base station system BSS each cell is served by a base transceiver station BTS. A number of base transceiver stations are connected to a base station controller BSC, which controls the radio frequencies and channels the BTS uses. The BSCs are connected to a mobile services switching centre MSC. Certain mobile services switching centres are connected to other telecommunication networks ON, such as the public switched telephone network PSTN or a data network, and they comprise gateway functions for calls originating from and terminating at those networks. These centres MSC are known as gateway MSCs (GMSC). Further, there are at least two databases, a home location register HLR and a visitor location register VLR.

Figure 1:
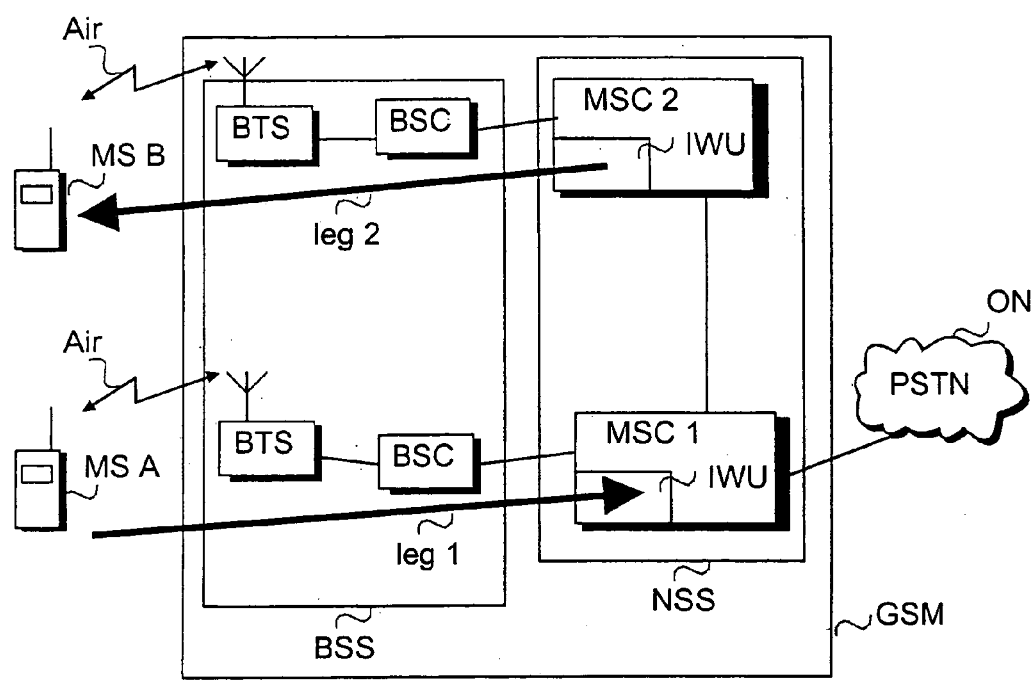
FIG. 1 illustrates different legs of the same connection by way of example.

The mobile communication system comprises adaptation functions to adapt the internal data connection of the mobile communication network to the protocols used by terminals and other telecommunication networks. Typical adaptation functions include a terminal adaptation function TAF (not shown in FIG. 1) on the interface between a mobile station and a data terminal connected to it, and an interworking function IWF on the interface between a mobile communication network and another telecommunication network, usually in connection with a mobile services switching centre. In the example of FIG. 1, an interworking unit IWU including the interworking function IWF is located in mobile services switching centres MSC 1 and MSC 2. Alternatively, an IWU can be located in some other network element or as an independent element. In this application, the term 'interworking unit' thus refers to a network element comprising an interworking function.

Usually a mobile services switching centre comprises various types of adapter equipment pools for supporting different data services and data protocols, e.g. a modem pool with modems and telefax adapters for modem and telefax services, an UDI/RDI rate adapter pool etc.

In the GSM system, a data connection is established between the terminal adaptation function TAF of the mobile station MS and the interworking function IWF in the mobile communication network. Said GSM data connection is established over the physical connection using one or more traffic channels on the air interface. The IWF switches the GSM data connection to another network, such as the ISDN or another GSM network, or to the public switched telephone network PSTN. If one party of the data connection is a terminal in a fixed network, such as in the PSTN, the leg 2 is formed between the interworking function of the gateway mobile services switching centre and the terminal. The interworking functions, such as the IWF, take care of bearer services, by which e.g. technical prerequisites for switching functions are created for teleservices. A bearer service can guarantee a specific, even as high as 64 kbit/s, user rate on the air interface. The interworking function IWF buffers data packets and performs the flow control. How the flow control and the buffering are performed has no relevance to the present invention, and thus it is not described in greater detail herein.

Data traffic between the MSC/IWU and the base transceiver station is transparent, and the present invention does not affect the operation of other network elements, such as base station controllers BSC or base transceiver stations BTS etc.

In addition to prior art means needed for data transmission services, the mobile communication system implementing the functionality of the present invention comprises means for adapting the traffic channel capacity on the air interface to correspond to the traffic channel capacity on the air interface of another mobile station in the same data transmission connection, or to the channel capacity of the fixed network used by the connection. The means are preferably located in connection with the call control of the mobile services switching centre or in connection with the interworking unit. The means or part of the means can also be located somewhere else.

The network structure requires no equipment changes. It comprises processors and memory, which can be utilized in the functions according to the invention. All changes needed for implementing the invention can be performed as added or updated software routines to accomplish the functionality of the invention. Depending on the embodiment of the invention, memory extension may be needed. It is, however, restricted to a small amount which is enough to store excess resource allocation information, i.e. the information on the capacity of each leg.

In this connection, the term 'capacity' refers to a traffic channel on the air interface, allocated to a leg, and channel coding used therein, which determine the data transmission rate on the air interface of the user.

In the following, the invention will be described according to the preferred embodiments. How traffic channels and their subchannels and the used channel codings are allocated and how the allocations are changed during the connection, have no relevance to the invention, and thus they are not described in greater detail herein. It is equally irrelevant to the invention how the order of data is maintained in multichannel transmission, and so it will not be described herein in greater detail either.

Figure 2:
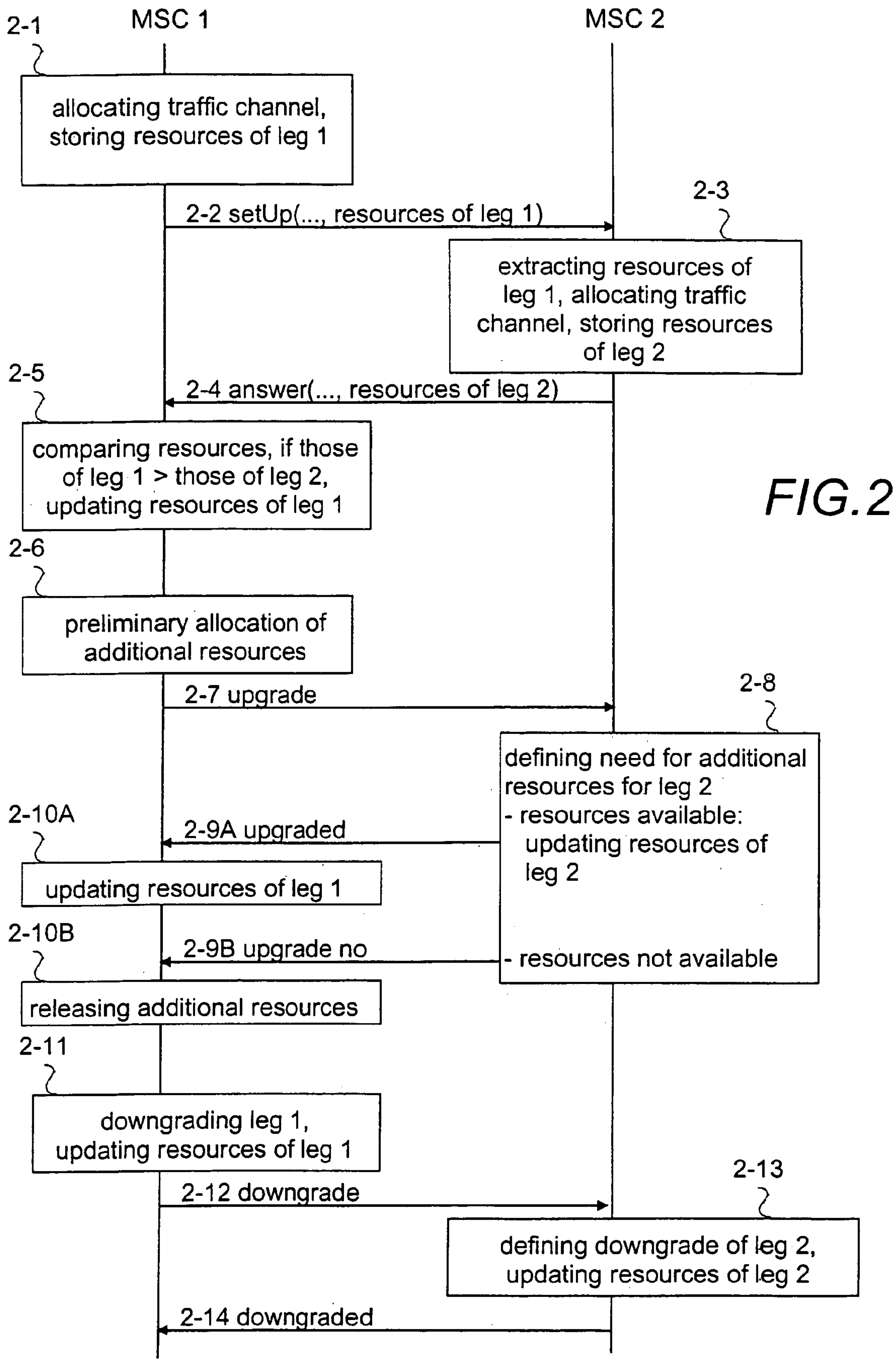
FIG. 2 shows a signalling diagram in a first preferred embodiment of the invention.

FIG. 2 illustrates signalling according to a first preferred embodiment of the invention. In the first preferred embodiment of the invention, leg-specific channel allocation information of the connection is maintained in the mobile services switching centre. In the example of FIG. 2, two mobile stations under different switching centres participate in the call. If mobile stations are under the same switching centre, the signalling shown in FIG. 2 is internal signalling of the switching centre. In other words, the mobile services switching centre MSC 1 shows a call process responsible for the leg 1 and the MSC 2 shows a call process responsible for the leg 2. Their physical location may change during the connection because of the handover between the switching centres, performed by the mobile station. It is further assumed that in the used channel allocation method a slower connection is established, if the amount of resources required by the desired data transmission rate is not available.

In step 2-1, the mobile services switching centre MSC 1 has received from the mobile station A a request for call set-up to the mobile station B. The call set-up request includes the data transmission rate requested for the connection, on the basis of which the mobile services switching centre MSC 1 allocates the traffic channel to the connection and forms a leg 1. At the same time, the mobile services switching centre stores the information on the connection and on the resources allocated on the air interface to the leg 1 of the connection. The information on the resources allocated to the connection is indicated, for example, in the form of the number of the allocated subchannels and the used channel coding and/or the data transmission rate of the user on the air interface.

Thereafter, the mobile services switching centre MSC 1 routes the call set-up request to the mobile services switching centre MSC 2 serving the mobile station B and transmits the call set-up request (setUp) in a message 2-2. In the first preferred embodiment of the invention, both the usual parameters and the information on the resources allocated to the leg 1 on the air interfaces are added to the call set-up request.

Then, the mobile services switching centre MSC 2 also extracts the information on the resources allocated to the leg 1 from the call set-up request. The mobile services switching centre MSC 2 allocates the traffic channel to the leg 2 of the connection preferably to correspond to the resources allocated to the leg 1 in step 2-3. If the mobile services switching centre MSC 2 has not enough subchannels available, less resources are allocated to the leg 2 than have been allocated to the leg 1. In the first preferred embodiment of the invention, however, no more resources are allocated to the leg 2 than to the leg 1. After the traffic channel has been allocated, the mobile services switching centre MSC 2 stores the information on the resources allocated to the leg 2 in step 2-3. Then the mobile services switching centre MSC 2 transmits an answer message 2-4 to the call set-up request. In the first preferred embodiment, the answer message includes the information on the resources allocated to the leg 2. In some other embodiments, the message 2-4 includes the information on the resources allocated to the leg 2 only when not as much resources could be allocated to the leg 2 as to the leg 1.

Upon receiving the message 2-4, the mobile services switching centre MSC 1 extracts the information on the resources allocated to the leg 2 from the message in step 2-5 and compares them with the resources allocated to the leg 1. If the resources allocated to the leg 2 are smaller than the resources allocated to the leg 1, the mobile services switching centre MSC preferably releases part of the resources allocated to the leg 1 in such a manner that the resources of the legs correspond to each other, and updates the information of the resources allocated to the leg 1 to correspond to the changed situation. This provides the advantage that the resources on the air interface of both sides are able to convey data with the same transmission rate so that the need for flow control and buffering is minimized and that the resources are not uselessly allocated on either of the air interfaces.

When the resources on the air interface allocated to both legs 1 and 2 correspond to each other and the connection is established, the mobile services switching centres start to monitor the traffic of the legs allocated to the connection. In the following, it is assumed by way of example that both the upgrade and the downgrade are performed for the leg 1.

In step 2-6, the leg 1 needs to be upgraded. The decision on the need for upgrade is made according to the prior art. Differing from the prior art, in the first preferred embodiment of the invention the excess resources are preliminarily allocated to the leg 1 in step 2-6, and a message 2-7 informing about the need for upgrade is transmitted to the mobile services switching centre MSC 2. The message 2-7 includes the information on how much the amount of resources allocated to the leg 1 would be upgraded. It is expressed either directly by indicating the desired amount of additional resources or the desired total amount of the resources of the leg 1. Upon receiving it, the mobile services switching centre MSC 2 defines the information on the additional resources needed for the leg 2 and checks whether it has said amount of additional resources available in step 2-8. If there are resources available, the mobile services switching centre MSC 2 allocates them to the leg 2, updates the information on the resources allocated to the leg 2 to correspond to the new situation and transmits an acknowledgement of the upgrade in a message 2-9A. The message includes either the information on how big the upgrade was or the information on the resources allocated to the leg 2 after the upgrade. This provides the advantage that if not all the desired additional resources can be allocated to the leg 2, the upgrading can, however, be performed, and the amount of resources in both legs is the same. Upon receiving the message 2-9A, the mobile services switching centre MSC 1 allocates an amount of additional resources to the leg 1, which was expressed in the message 2-9A, and updates the information on the resources allocated to the leg 1 in step 2-10A.

In some other embodiment, in which not so much resources as desired can be allocated to the leg 2, additional resources are not allocated, but it is acted as if there were no resources available.

If the mobile services switching centre MSC 2 detects in step 2-8 that no resources at all are available, it transmits the information forbidding the upgrade to the mobile services switching centre MSC 1 in a message 2-9B (upgrade no). In this case, the mobile services switching centre MSC 1 releases the additional resources preliminarily allocated to the leg 1 in step 2-10B and does not perform the upgrade. This provides the advantage that resources that cannot be used due to the smaller resources on the air interface of the second leg are not uselessly allocated on the air interface of the first leg.

In some embodiments, after transmitting the message 2-9B, the mobile services switching centre MSC 2 may stay and observe its resource situation, and when it detects that resources are being released, it can, for its part, transmit a message 2-8 requesting the upgrade to the mobile services switching centre MSC 1.

In step 2-11, the leg 1 is downgraded. The decision on the need for downgrade is made according to the prior art. Differing from the prior art, in the first preferred embodiment of the invention the resource information of the leg 1 is updated in step 2-11, and a message 2-12 reporting on the downgrade is transmitted to the mobile services switching centre MSC 2. The message 2-12 includes the information on how much the amount of resources allocated to the leg 1 was downgraded. It is expressed either directly by indicating the decreased amount of resources or by indicating the total amount of resources of the leg 1 after the downgrade. Upon receiving the message 2-12, in step 2-13, the mobile services switching centre MSC 2 defines the information on the required reduction in resources for the leg 2, releases the useless resources and updates the information on the resources allocated to the leg 2 to correspond to the new situation. Then it transmits an acknowledgement of the downgrade in a message 2-14. The message may be a simple acknowledgement message or it can include the information either on how big the downgrade was or the information on the resources allocated to the leg 2 after the downgrade.

In some other embodiments, the information on the resources on the air interface is not yet added to the message 2-2 but it is transmitted as a separate message after the call set-up. The information on the resources allocated to the connection on the air interface can first be transmitted from the leg 1, i.e. the mobile services switching centre MSC 1, to the leg 2, i.e. the mobile services switching centre MSC 2, which compares the resources with each other. If the resources of the leg 2 are bigger than those of the leg 1, the mobile services switching centre MSC 2 releases resources allocated to the leg 2 to correspond to the resources of the leg 1. If the resources of the leg 1 are bigger than those of the leg 2, the mobile services switching centre MSC 2 preferably transmits the information on the resources allocated to the leg 2 to the mobile services switching centre MSC 1, after which the mobile services switching centre MSC 1 compares the resources and releases a part of the resources allocated to the leg 1. The information on the resources allocated to the leg is updated. It is also possible that the mobile services switching centres transmit the information on the resources allocated to their own leg on the air interface to each other. Then, the mobile services switching centre in which more resources have possibly been allocated, releases the excess resources.

In some other embodiment of the invention, mobile services switching centres may transmit the information to the other mobile services switching centre always when the utilization ratio of the allocated resources changes. Then the other mobile services switching centre can conclude whether it is worthwhile to perform an upgrade or downgrade in its own leg, and if it is, how much.

The steps and signalling messages described above in FIG. 2 are not in an absolute chronological order and some steps can be performed simultaneously or in an order differing from the order which was described. The signalling messages are only illustrative and may also include several separate messages to convey the same information. Further, messages may also include other information. Messages can also be freely combined or divided into several parts. For example, the upgrade procedure may be performed by asking a permission, getting the permission, allocating additional resources, transmitting the information on the allocation of the additional resources, allocating the additional resources to the other leg and transmitting the information on that. In the first preferred embodiment it is essential that the information on the allocation situation of different legs is exchanged always when the allocation situation changes. Without this information, the allocation situation of one leg cannot be adapted to correspond to the resources allocated to the other leg. Each mobile services switching centre concludes independently, how to adapt its own situation on the basis of the resource situation of the other. Depending on the network structure, other network elements to which various functionalities have been distributed can also participate in conveying the information and signalling.

It is obvious to a person skilled in the art how the above description is applied when many different mobile stations participate in the same data call.

Although it is assumed above for the sake of clarity that the channels on the air interface are allocated symmetrically, the invention can also be applied when asymmetrical channel allocation is used. For example, the steps described above in FIG. 2 can be carried out separately for an uplink transmission path and a downlink transmission path. Alternatively, the information on the resource situation of both directions of the leg or the need for changing the situation can always be included in messages. In that case, it has to be remembered that the uplink transmission path of the leg 1 must be adapted to the downlink transmission path of the leg 2. Correspondingly, the downlink transmission path of the leg 1 must be adapted to the uplink transmission path of the leg 2.

Figure 3:
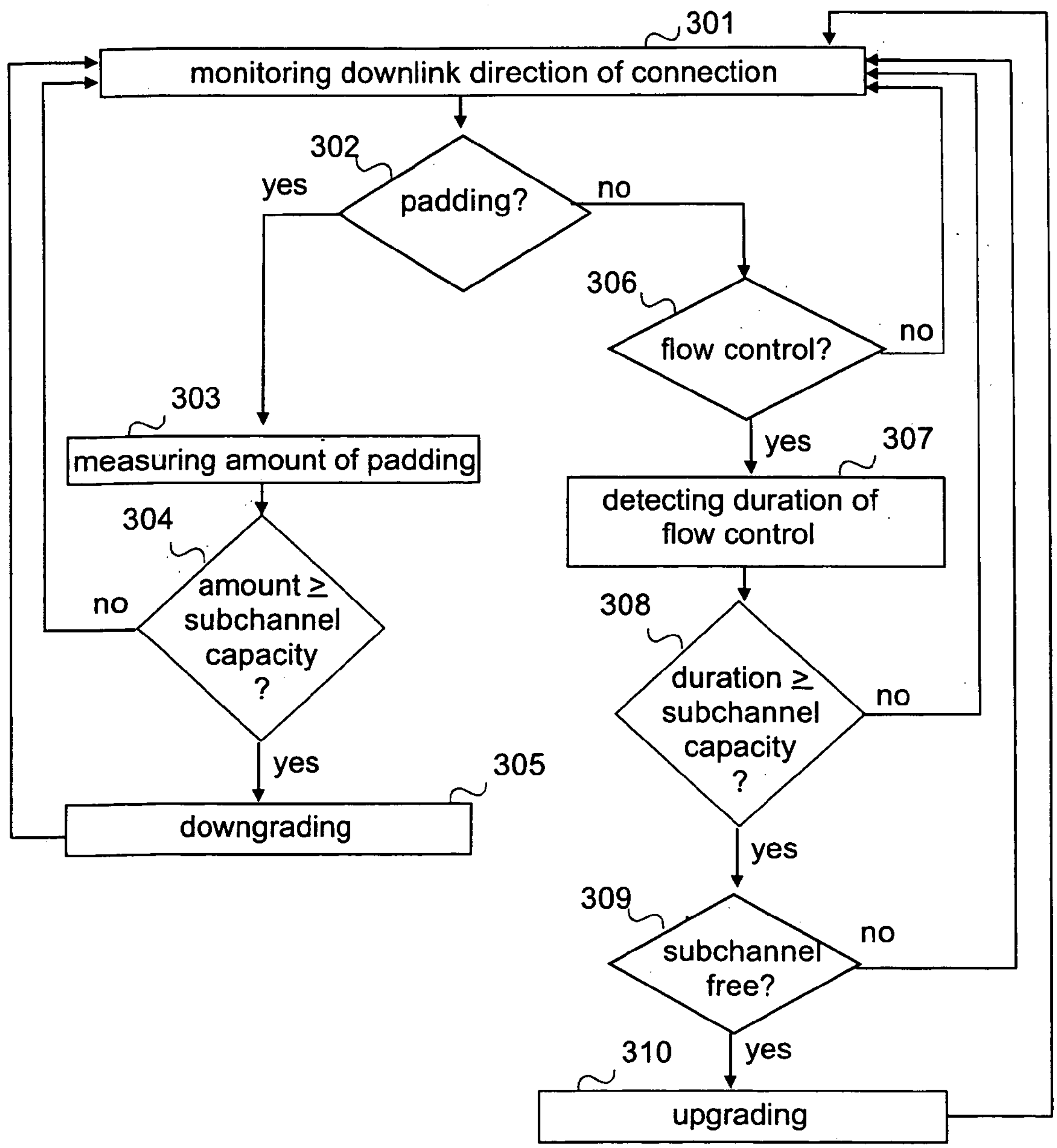
FIGS. 3 and 4 show the operation according to a second preferred embodiment of the invention as a flow chart.
Figure 4:
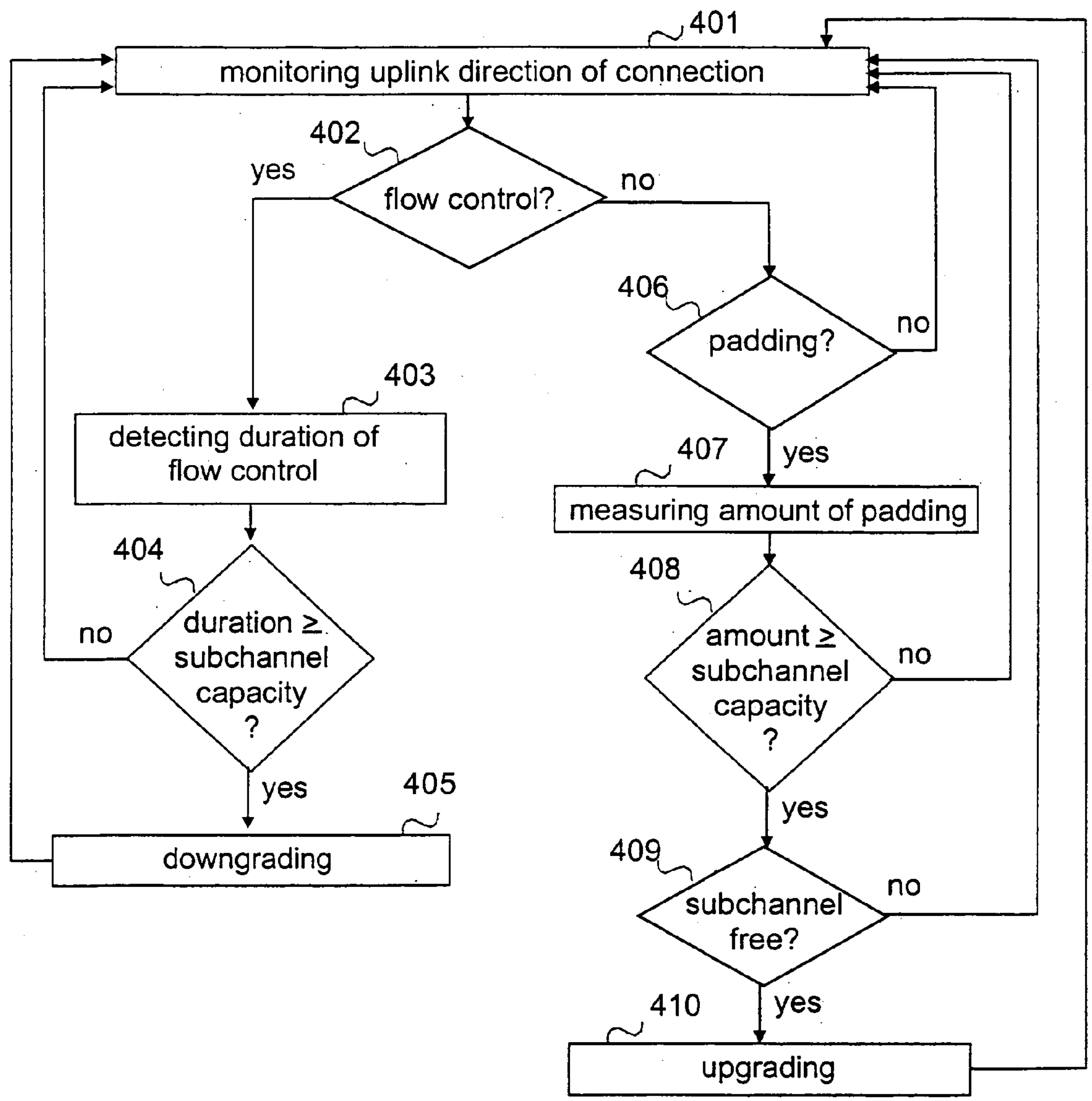

FIGS. 3 and 4 show the operation according to a second preferred embodiment of the invention. In the second preferred embodiment of the invention, no separate signalling is required, but the interworking unit observes data traffic to the uplink and downlink directions in each connection. The connection is divided into two connection parts. The first connection part exists between the mobile station and the interworking unit. The second connection part exists between the interworking unit and the other party of the data connection. The other party can be a mobile station or a terminal in a fixed network. The difference in the rate between these connection parts can be detected by observing. In the second preferred embodiment of the invention, the invention is also applicable to a call between apparatuses in two different systems, e.g. between a mobile station and a fixed network. FIG. 3 illustrates the observation and adaptation of the use of resources on the downlink traffic channel. Correspondingly, FIG. 4 illustrates the observation and adaptation of the use of resources on the uplink traffic channel of the same connection. In the examples of FIGS. 3 and 4, the adaptation of the capacity on the air interface is based on detecting padding and/or flow control during the monitoring. Alternatively, e.g. the amount of padding and the filling degree of the buffer can be monitored. Monitoring helps to detect the difference in the data transmission rates of the connection parts, and thus of the whole connection. The appearance of padding or flow control in the payload flow or payload flow buffering are events indicating capacity differences of the connection. A difference in the capacity refers both to a difference in the use of capacity, i.e. different payload transmission rates, and to a difference between different amounts of capacities. By defining the "extent" of an event, the difference between the connection parts can be concluded. The extent of padding is defined by measuring the amount of padding, the extent of flow control is defined by finding out its duration and the extent of buffering is defined by finding out the filling degree of the buffer or the filling rate of the buffer.

With reference to FIG. 3, the starting situation is a situation after the call set-up. In step 301, the downlink direction of the connection is monitored. In other words, the output and input channels of the downlink direction are monitored in an interworking unit. In step 302 it is checked whether padding (fill frames, Receiver Ready frames etc.) is transmitted in the outgoing direction, i.e. in the direction of the mobile station. The transmission of padding may indicate that too much capacity on the air interface is allocated. If it is detected in step 302 that padding is supplied to the output channel, the amount of padding transmitted in the direction of the mobile station is measured in step 303. In step 304 the amount of padding to be transmitted is compared with the subchannel capacity. In other words, it is checked how much padding is to be transmitted in regard to the subchannel capacity. Thus, it is detected how much padding there is in the transmission compared to the smallest step of change in the capacity. The smallest step of change is preferably the capacity of one subchannel. The step of change can also be defined as being of a different size. On the basis of the comparison in step 304 it is detected whether, in addition to the payload, the padding has to be transmitted so much that the channel capacity could be decreased without slowing down or significantly slowing down the payload transmission.

If too much capacity, i.e. at least the capacity of one subchannel, is allocated to the downlink direction, (and thus the condition of step 304 is fulfilled), the capacity allocated to the connection is decreased by performing the downgrade performed in step 305. In the second preferred embodiment, one subchannel at a time is downgraded. It would be possible to downgrade more subchannels at one time, if the amount of padding corresponds to at least the combined capacity of the subchannels to be "released". After the downgrade procedure, the process returns to step 301 to monitor the downlink direction of the connection. The process returns to step 301 straight from step 304, if the amount of padding does not correspond to at least the capacity of the subchannel.

If it is detected in step 302 that the padding need not be transmitted, i.e. the amount of data needs all allocated capacity, it is detected in step 306 whether flow control to the input channel, i.e. the trunk circuit, is required in the example of FIG. 3. The need for flow control may indicate that too little capacity on the air interface is allocated. If flow control is not needed, the process returns to step 301 to monitor the downlink direction.

If flow control is needed, the duration of the flow control is detected in step 307. Then, the duration of the flow control is compared with the subchannel capacity in step 308. In this way, it is detected whether the duration of the flow control during the measurement period is so long that the additional capacity could be used for transferring payload. For example, if the flow control is active half of the time, the channel capacity could be doubled.

If it is detected in step 308 that the flow control duration does not correspond to the subchannel capacity (i.e. the size of the smallest step of change), the process returns to step 301 to monitor the downlink direction of the connection.

If it is detected in step 308 that the duration of the flow control corresponds to at least the subchannel capacity, it is checked in step 309, whether there are resources, i.e. a subchannel (or subchannels), available on the air interface. If there are no resources available on the air interface, the process returns to step 301 to monitor the downlink direction of the connection.

If it is detected in step 309 that there are resources available on the air interface, the upgrade procedure is performed in step 310 and the required number of subchannels are allocated. Then, the process advances to step 301 to monitor the downlink direction of the connection.

In the embodiments, in which events indicating the capacity difference include the transmission of padding and the buffering of data flow, steps 306, 307 and 308 of FIG. 3 are different. In step 306, the need for buffering is checked. If it is not needed, the process advances to step 301. If the buffering is needed, the filling degree or filling rate of the data buffer is detected in step 307. In step 308 it is checked, whether the filling degree or filling rate of the buffer exceeds a predetermined threshold. A threshold can, for instance, be such that it corresponds to the capacity of one subchannel. If the threshold is exceeded, the process advances to step 309, which is the same as in the example described above in greater detail.

A decision on the upgrade of the downlink direction can thus be made e.g. on the basis of the flow control duration or the filling degree or filling rate of the buffer, and a decision on the downgrade of the downlink direction on the basis of the amount of padding to be transmitted. The capacity difference between the connection parts is detected on the basis of the padding, flow control or buffering. As it appears from the above, the downlink direction is upgraded, if there are resources available on the air interface and the predetermined upgrade-related conditions for the flow control duration or the filling degree or filling rate of the buffer are fulfilled. The conditions may differ from what is described above, and, for instance, in step 308 the duration or the filling rate can be compared with a half of the subchannel capacity, for example. Correspondingly, the downgrade is performed, if the predetermined condition for the amount of padding to be transmitted is fulfilled. In steps 304 and 308, the change values may differ from each other. The condition relating particularly to step 304 is preferably the smallest possible change value for the capacity. This ensures that the downgrade does not cause a need for flow control and/or buffering.

FIG. 4 starts from the situation after the call set-up. In step 401, the uplink direction of the connection is monitored. In other words, the output and input channel of the uplink direction are monitored. In step 402 it is checked whether flow control to the input channel, i.e. the mobile station, is required in the example of FIG. 4. The need for flow control may indicate that too much capacity on the air interface is allocated. If it is detected in step 402 that flow control is needed, the duration of the flow control is detected in step 403. Thereafter, the flow control duration is compared with the subchannel capacity in step 404. In this way it is found out whether the flow control duration during the measurement period is so long that the channel capacity could be decreased at least by the amount of the smallest step of change without slowing down or significantly slowing down the payload transmission.

If it is detected in step 404 that the duration of the flow control does not correspond to the subchannel capacity (i.e. the size of the smallest step of change), the process returns to step 401 to monitor the uplink direction of the connection.

If it is detected in step 404 that the duration of the flow control corresponds to at least the subchannel capacity, the capacity allocated to the connection is decreased by performing the downgrade procedure in step 405. In the second preferred embodiment, one subchannel is downgraded at a time. It would also be possible to downgrade more subchannels at one time, if the duration of the flow control corresponds to at least the combined capacity of the subchannels to be "released". For example, if the flow control is active half of the time, the channel capacity could be doubled. After the downgrade procedure, the process returns to step 401 to monitor the downlink direction of the connection.

If it is detected in step 402 that flow control is not needed, i.e. that the amount of data needs all capacity, it is checked in step 406 whether padding (fill frames, Receiver Ready frames etc.) is transmitted in the outgoing direction, i.e. the direction of the trunk circuit. The transmission of padding may indicate that too little capacity on the air interface is allocated. If the padding is not transmitted, the process returns from step 406 to step 401 to monitor the uplink direction of the connection.

If it is detected in step 406 that padding is supplied to the output channel, the amount of padding transmitted to the trunk circuit is measured in step 407. In step 408, the amount of padding to be transmitted is compared with the subchannel capacity. In other words, it is checked how big is the amount of padding to be transmitted in regard to the subchannel capacity. In this way, it is detected how much padding the transmission includes, when compared to the smallest step of change of the capacity. On the basis of the comparison in step 408, it is detected whether, in addition to the payload, so much padding is transmitted that the additional channel capacity could be used for data transmission so that the resources on the air interface are not wasted.

If the condition in step 408 is not fulfilled, the process returns to step 401 to monitor the uplink direction of the connection.

If it is detected in step 408 that the duration of the flow control corresponds to at least the capacity of one subchannel, it is checked in step 409 whether there are resources, i.e. a subchannel or subchannels, available on the air interface. If there are no resources available on the air interface, the process returns to step 401 to monitor the uplink direction of the connection.

If it is detected in step 409 that there are resources available on the air interface, the upgrade is performed in step 410 and a necessary number of subchannels are allocated. Then the process advances to step 401 to monitor the uplink direction of the connection.

In the embodiments, in which events indicating the capacity difference include the transmission of padding and the buffering of data flow, steps 402, 403 and 404 of FIG. 4 are different. In step 402, the need for buffering is checked. If the buffering is not needed, the process advances to step 406, from which it continues as described above. If the buffering is needed, the filling degree or filling rate of the data buffer is detected in step 403. In step 404 it is checked, whether the filling degree or filling rate of the buffer exceeds a predetermined threshold. A threshold can, for instance, be such that it corresponds to the capacity of one subchannel. If the threshold is exceeded, the process advances to step 405, which is the same as in the example described above in greater detail.

A decision on the upgrade of the uplink direction can thus be made e.g. on the basis of the amount of padding to be transmitted, and a decision on the downgrade of the uplink direction on the basis of either the flow control duration or the filling degree or filling rate of the buffer. The capacity difference between the connection parts is detected on the basis of the padding, flow control or buffering. As it appears from the above, the uplink direction is downgraded, if a predetermined downgrade-related condition for the flow control duration or the filling degree or filling rate of the buffer is fulfilled. Correspondingly, the upgrade is performed, if there is capacity available on the air interface and the predetermined condition for the amount of padding to be transmitted is fulfilled. The conditions may differ from what is described above, and, for instance, in step 408 the amount of padding can be compared with a half of the subchannel capacity, for instance. In steps 404 and 408, the change values may differ from each other. The condition relating particularly to step 404 is preferably the smallest possible change value for the capacity. This ensures that the downgrade does not cause a need for flow control and/or buffering.

If a symmetrical allocation is used in the second preferred embodiment, it is preferable to combine the functions described in FIGS. 3 and 4. In such a combined embodiment, the downgrade is only performed if the observation of both the uplink and the downlink sides supports the downgrade. If the downgrade allowed by the uplink side is not the same as the downgrade allowed by the downlink side, a downgrade procedure is performed with the smaller allowed downgrade.

In such a combined embodiment, the upgrade is performed if the observation of either side allows the upgrade and if there is capacity available. The upgrade level is equal to the amount indicated by the observation.

The steps described above in FIGS. 3 and 4 are not in an absolute chronological order and some steps can be carried out simultaneously or in an order differing from the described order. Between the steps, also other functions can be performed. The conditions for the upgrade and downgrade procedures may also differ from what is described above. The conditions can also vary according to the allocation situation of the data transmission resource (i.e. the air interface resource). For example, if all resources are allocated, a condition can be set for the downgrade procedure, the condition corresponding to the half of the lowest possible change value for the capacity, for instance. If there are resources available, a stricter condition allowing the downgrade procedure may be used. It is essential that the real transmission rates of both connection parts, i.e. the efficiency of the use of the allocated transmission capacity, are compared with each other. When the comparison is carried out in uplink and downlink directions, also when the asymmetrical allocation is used, the optimal use of resources on the air interface of both directions is ensured.

If a mobile station requests more channel capacity (e.g. the UIMI/Modify function of the GSM, User Initiated Modification Indication), the network can utilize the prevailing capacity of the trunk circuit, estimated on the basis of the functions of the invention, and restrict the channel capacity of the mobile station to correspond to the situation of the trunk circuit.

It is obvious to a person skilled in the art that as technology develops, the basic idea of the invention can be implemented in various ways. The invention and the embodiments thereof are thus not restricted to the examples described above, but they may vary within the scope of the claims both in systems based on a fixed network and in systems based on wireless data transmission.

What is claimed is:

1. A method for optimizing the use of data transmission resources, the method comprising:

forming an end-to-end connection between a terminal in a telecommunication system and another party of the end-to-end connection, the end-to-end connection including a first connection part between the terminal and a network element in the telecommunications system and a second connection part between the network element and the other party, monitoring the end-to-end connection to detect an event indicating a difference between a capacity of the first connection part and a capacity of the second connection part, defining an extent of a detected event, checking whether an extent of the detected event fulfills a predetermined condition, and if the condition is fulfilled, changing the capacity allocated to the first connection part from data transmission resources in such a manner that a difference between the capacities of first and second connection parts decreases.

2. The method of claim 1, wherein the monitoring, defining, checking and changing are performed separately for an uplink and a downlink direction of the connection.

3. The method of claim 1, wherein the monitoring, defining and checking are performed separately for an uplink and a downlink direction of the connection, and the method further comprises upgrading the capacity of the first connection parts if the extent of the event of either the uplink direction or the downlink direction fulfills the predetermined condition.

4. The method of claim 1, wherein the monitoring, defining, checking and changing are performed separately for an uplink and a downlink direction of the connection, and the method further comprises downgrading the capacity of the first connection parts when the predetermined condition relating to a downgrade is fulfilled in both the uplink and downlink directions.

5. The method of claim 4, wherein the downgrading includes downgrading the capacity of the first connection parts by a smaller downgrade amount allowed if a downgrade amount allowed by the uplink side is a different downgrade amount from a downgrade amount allowed by the downlink side.

6. The method of claim 1, wherein the event indicating the difference between capacities of the first and second connection parts is a transmission of padding, and the extent of the event is defined by measuring the amount of the padding to be transmitted.

7. The method of claim 1, wherein the event indicating the difference between capacities of the first and second connection parts is a need for flow control, and the extent of the event is defined by detecting a duration of the flow control.

8. The method of claim 1, wherein the event indicating the difference between capacities of the first and second connection parts is buffering, and the extent of the event is defined by detecting a filling degree or filling rate of the buffer.

9. The method of claim 1, wherein the event indicating the difference between capacities of the first and second connection parts is information received from the other party on an allocated capacity thereof and wherein the extent of the event is defined at least partially based on a difference in the allocated capacity expressed by the information.

10. The method of claim 1, wherein the telecommunication system is a mobile communication system and the data transmission resources are resources on an air interface.

11. A method for optimizing the use of resources on an air interface between a mobile station in a mobile communication system and a communication network in a data call between the mobile station and another part of the data call, the method comprising:

forming an end-to-end connection including a first leg between the mobile station and a network element in the mobile communication system and a second leg between the network element of the mobile communication system and the other party, maintaining information indicating a capacity of the first leg on the air interface, receiving information indicating a capacity of the second leg, comparing the capacities of the first and second legs with each other, if the capacities differ from each other, changing the capacity of the first leg on the air interface to correspond to the capacity of the second leg.

12. The method of claim 11, further comprising transmitting capacity change information associated with the first leg to the second leg.

13. A method of claim 11, further comprising:

transmitting information indicating an intention to change the capacity of the first leg to the second leg, receiving information indicating whether the second leg is capable of a capacity change corresponding to the intended capacity change of the first leg, and changing the capacity of the first leg when the second leg is capable of the corresponding capacity change.

14. A method of claim 11, further comprising:
receiving information indicating an intention to upgrade the capacity of the second leg,
checking the available capacity of the first leg,
transmitting information to the second leg indicating that the capacity of the second leg can be upgraded when at least an amount of capacity corresponding to the intended capacity change of the second leg is available in the first leg, and
if there is not an amount of capacity corresponding to the intended capacity change of the second leg available in the first leg, transmitting information to the second leg indicating that the capacity of the second leg is not allowed to be upgraded.

15. A mobile communication system comprising:
a plurality of mobile stations including a first mobile station and a second mobile station,
an air interface between the first and second mobile stations and the mobile communication system, and
a first network element configured to form a first leg of the connection between the first mobile station and the first network element, the first network element being configured to allocate capacity to the first leg from the air interface, and
a second network element configured to form the second leg between the second mobile station and the second network element, the second network element being configured to allocate capacity to the second leg from the air interface,
wherein the first network element is configured to maintain information on the capacity allocated to the first leg from the air interface, receive information on the capacity of the second leg, compare the capacities of the first and second legs with each other and change the capacity of the first leg to correspond to the capacity of the second leg based on a difference between the capacities of the first and second legs, and the second network element is configured to transmit information associated with the capacity of the second leg to the first network element.

16. The mobile communication system of claim 15, wherein the second network element is configured to transmit information associated with the capacity of the second leg to the first network element in response to a capacity change of the second leg.

17. A mobile communication system of claim 15, wherein the first network element is configured to inquire of the second network element whether the capacity of the second leg can be changed and configured to change the capacity of the first leg only if the capacity of the second network element can be changed, and wherein the second network element is configured to receive the inquiry relating to changing the capacity of the second leg and to transmit information associated with potential capacity change of the second leg in response to the inquiry relating to changing the capacity.

18. A mobile communication system of claim 15, wherein the first network element and the second network element are the same network element and are arranged to convey information associated with a capacity of the first and second legs as internal information of the network element.

19. A network element for a telecommunication network, the network element comprising:
an interworking function
and being configured to (i) monitor a connection between a terminal in connection with the telecommunication network and a second party,
(ii) detect an event indicating a difference between a capacity of a first connection part between the terminal and the interworking unit and a capacity of a second connection part between the second party and the interworking unit, (iii) define an extent of the event and (iv) change capacity allocated to the connection from data transmission resources between the telecommunication network and the terminals when the extent of the event fulfills a predetermined condition.

20. The network element of claim 19, further configured to monitor, detect, define and change the allocated capacity of the first connection parts separately for uplink and the downlink directions of the connection.

21. The network element of claim 19, further configured to monitor, detect and define an uplink and downlink direction of the connection separately and to increase capacity of the terminal if a predetermined condition relating to an upgrade of the capacity is fulfilled in either the uplink or downlink direction and to decrease the capacity of the terminal only if a predetermined condition relating to a downgrade of the capacity is fulfilled in both the uplink and downlink directions.

22. The network element of claim 19 wherein the network element is an interworking unit of the mobile communication network and the data transmission resources are resources on the air interface.

23. The method of claim 11, further comprising:
receiving information from the second leg associated with the intention to upgrade the capacity of the second leg,
checking the available capacity of the second leg, and
transmitting information to the second leg indicating that the capacity of the second leg is not allowed to be upgraded when at least a predetermined minimum amount of capacity is not available.

24. The network element of claim 19, wherein the network element is an interworking unit.

* * * * *